United States Patent [19]

Okano et al.

[11] 4,047,807
[45] Sept. 13, 1977

[54] DIAPHRAGM DEVICE

[75] Inventors: Yukio Okano, Minamikawachi; Nobuyuki Kita, Osaka; Kyozo Uesugi, Izumi, all of Japan

[73] Assignee: Minolta Camera Kabushiki Kaisha, Japan

[21] Appl. No.: 644,320

[22] Filed: Dec. 24, 1975

[30] Foreign Application Priority Data

Dec. 26, 1974  Japan ............... 49-148439
Dec. 26, 1974  Japan ............... 49-148440

[51] Int. Cl.² .................................................. G03B 9/02
[52] U.S. Cl. ........................... 350/266; 350/162 SF; 354/274; 358/55
[58] Field of Search ............... 350/206, 266, 162 SF; 354/274; 358/47, 55

[56] References Cited

U.S. PATENT DOCUMENTS

1,302,359  4/1919  Garbutt ............... 354/274
3,132,576  5/1964  Mahn ............... 354/274
3,768,888  10/1973  Nishino et al. ............... 350/162 SF Primary Examiner—John K. Corbin
Assistant Examiner—Matthew W. Koren
Attorney, Agent, or Firm—Watson, Cole, Grindle & Watson

[57] ABSTRACT

A diaphragm device in which a plurality of diaphragm blades are arranged in partly overlapping relation to one another. This diaphragm device provides a diaphragm aperture of a substantially elongated circle having its length extending in a specific direction, when stopped down beyond a given diaphragm aperture. More particularly, the diaphragm aperture is defined by a pair of arcs which oppose each other in a direction perpendicular to the specific direction passing through the center of the aperture and another pair of arcs which are disposed on the opposite sides in the aforesaid specific direction, while the distance of either one of the pair of arcs to the center of the aperture is shorter than the distance of either of the other pair of arcs to the center of the aperture. These pairs of arcs define portions of the inner peripheral edges of the diaphragm blades.

18 Claims, 15 Drawing Figures

DIAPHRAGM DEVICE

BACKGROUND OF THE INVENTION

This invention relates to a diaphragm device in which a diaphragm aperture is defined by portions of the inner peripheral edges of diaphragm blades which are arranged in partly overlapping relation to one another.

In those prior art diaphragm devices which provide diaphragm apertures defined by portions of the inner peripheral edges of a plurality of diaphragm blades arranged in partly overlapping relation to one another, the diaphragm aperture preferably defines a shape which is symmetric with respect to the center, i.e., the optical axis, so that the configuration of the aperture defined by the respective diaphragm blades are as close to a circle as possible.

However, the drawback with such an arrangement is that, when such a diaphragm is stopped down to its minimum aperture, the adjoining diaphragm blades interfere with each other, thus failing to provide a completely closed diaphragm. For this reason, a minimum diaphragm aperture necessarily results.

On the other hand, with a television camera, for instance, it has long been a demand that the light passing through an objective lens be blocked or shielded by means of a diaphragm device rather than a lens cap for the purpose of protecting the sensitive surface of a vidicon.

Still furthermore, with a color television camera provided with a color-encoding filter means for use in color separation, there results a beat between the striped color-signal carrier of such color encoding filter and the high frequency component of an image of a photographic object, thereby bringing about a false color. For this reason, an optical low pass filter having laminae which cause retardation of the light being transmitted therethrough is placed in an optical system of the television camera, thereby cutting off the high frequency components of an image formed through the objective lens, in an attempt to preclude the occurrence of a false color. (See U.S. Pat. Nos. 3,756,695 and 3,768,888 commonly owned herewith.)

However, such use of an optical low pass filter is only partly successful, i.e., when using the diaphragm device which provides a diaphragm aperture of a substantially circular shape about the axis of the optical path for stopping down the diaphragm beyond a given diaphragm aperture, so that the function of the optical low pass filter to cut off the high-frequency components of the image is sharply impaired.

Experimentation has shown that when using an objective lens having a focal length of 42 mm and an aperture ratio of 2.0 (aperture radius of 21 mm), and an optical low pass filter, in which the pitch of the grating is 1.9 mm, with the f-number of the diaphragm being set to over 11, then the function of the aforesaid optical low pass filter to cut off the high frequency component is radically impaired.

The relationship of the f-number to the diaphragm aperture for the aforesaid objective lens is as follows:

| f-number | 2.8 | 4 | 5.6 | 8 | 11 | 16 | 22 |
|---|---|---|---|---|---|---|---|
| diaphragm aperture | 14.9mm | 10.5mm | 7.4mm | 5.2mm | 3.7mm | 2.6mm | 1.8mm |

This experimentation further proves that when the diaphragm aperture is of a value less than two times the pitch of the grating of the optical low pass filter, it may not be expected to maintain the intended function of the optical low pass filter. This is also true with the objective lenses other than those used in the aforementioned tests.

Also, in these tests, the f-number could not be set to a value greater than 22 due to the particular device as well as due to a ghost image produced by the diffraction phenomenon of an image beam, which results from the stopping down operation. Even when the f-number is set between 11 and 22, it is imperative that, for maintaining the intended function of the optical low pass filter, the pitch of the grating of the low pass filter be reduced to 0.9 mm. This in turn dictates the reduction in the width of a striped color signal carrier of a color-enoding filter. This however is physically impossible, so that the extent of stopping down the diagraphm for an objective lens is necessarily subject to certain limitations.

According to the present invention, there is provided a diaphragm device, in which, unlike the prior art diaphragm device providing a circular diaphragm aperture, the configuration of a resulting diaphragm aperture is substantially of an elongated circular shape having its length extending in a specific direction, with this specific direction being perpendicular to the direction of the grating, so that even if the diaphragm device is stopped down to any small diaphragm aperture, the aperture may include or cover two rows of the laminae of a grating at all times, so that the intended function of the optical low pass filter to cut off the high frequency components may be maintained, while permitting a stopping down of the diaphragm to a value greater than the f-number of 11.

OBJECTS OF THE INVENTION

It is accordingly an object of the present invention to provide a diaphragm device wherein its diaphragm aperture may completely shield the light passing through an objective lens.

It is another object of the present invention to provide a diaphragm device for use in an optical system provided with the aforementioned optical low pass filter, which device permits the photographing at even a greater f-number, without sacrificing the function of a low pass filter to cut off the high spacial frequency, by providing a diaphragm aperture of a shape elongated in a specific direction, when the diaphragm is stopped down to a value beyond a given diaphragm aperture.

It is a further object of the present invention to provide a diaphragm device of a mechanism which, when stopped down to a value beyond a given diaphragm aperture, provides a diaphragm aperture substantially of an elongated circle having its length extending in a specific direction, in which the distance of one pair of arcs forming a part of the periphery of the diaphragm aperture to the center of the aperture is different from the distance of another pair of arcs forming the other part of the periphery of the diaphragm aperture to such center.

It is a still further object of the present invention to provide a diaphragm device of the type, in which a plurality of diaphragm blades arranged in partly overlapping relation define the diaphragm aperture by their partial inner peripheral edges, such device being of such a mechanism that, when stopped down to a value beyond a given diaphragm aperture, the distance covering from the center of the aperture to one pair of arcs opposing each other in a direction perpendicular to a specific direction passing through the center of the diaphragm aperture is smaller than the distance to the optical center, of another pair of arcs placed on the opposite sides of this specific direction, while such arcs are part of the inner peripheral edges of the diaphgragm blades.

It is yet a further object of the present invention to provide a diaphragm device of the type, in which a plurality of diaphragm blades arranged in partly overlapping relation define the diaphragm aperture, such device being of such a mechanism that permits continuous stopping-down until the diaphragm aperture is completely closed from its fully opened position.

Figure 15:
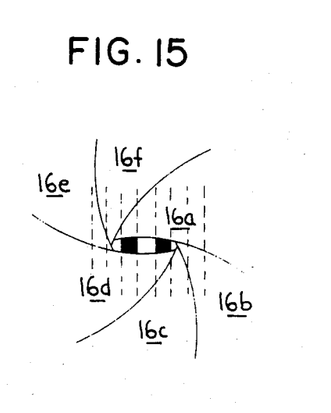
FIG. 15 is a front view showing the relationship between the grating of an optical low pass filter and the diaphragm aperture provided according to the present invention.

It is a further object of the present invention to provide a diaphragm device which, even if a diaphragm is stopped-down beyond a given diaphragm aperture, the resulting diaphragm aperture provides a configuration which may include or cover two rows of laminae of a grating, as shown in FIG. 15, the aforesaid diaphragm device being used in an optical system provided with a color-encoding filter means which consists of laminae causing retardation of light beams passing therethrough, in an attempt to cut off the high frequency components of an image formed in the aforesaid optical system, thereby preventing the occurrence of a false color which is produced in an image due to a beat created between the aforesaid color-encoding filter means and the striped color signal carrier.

These and other objects and features of the present invention will become more apparent from the following detailed description of the invention when taken in conjunction with the accompanying drawings which illustrate the preferred embodiments of the invention.

SUMMARY OF THE INVENTION

According to the present invention, there is provided a diaphragm device of the type, in which a plurality of diaphragm blades are slightly disposed in partly overlapping relation to one another on a base plate having at its center an opening of a size substantially the same as that of the aperture of an objective lens, this diaphragm device being such that when the diaphragm device is stopped-down beyond a given diaphragm aperture, the diaphragm aperture will be of such a configuration that the distance of either of one pair of arcs opposing each other in a direction perpendicular to a specific direction passing through the center of a diaphragm aperture to the center of the diaphragm aperture is smaller than the distance of either of another pair of arcs placed on the opposite sides in the aforesaid specific direction to the aforesaid center, while such arcs are portions of the inner peripheral edges of diaphragm blades, so that the configuration of the resulting diaphragm aperture will be substantially of an elongated circle having its length extending in the aforesaid specific direction.

Unlike the prior art diaphragm device in which the respective diaphragm blades of an identical shape are rotated through the same angle relative to the base plate so as to provide a diaphragm aperture having a periphery which is symmetric with respect to the center of the aperture, the present invention provides diaphragm device which provides a substantially elongated diaphragm aperture having its length extending in a specific direction, by rotating a pair of diaphragm blades opposing one another in a direction perpendicular to the aforesaid specific direction in a manner different from the rotation of the other diaphragm blades. In this respect, there is provided an even number of diaphragm blades. Thus, the distance of either of one pair of arcs defining the diaphragm aperture to the center of the aperture is different from the distance of either of another pair of arcs defining the diaphragm aperture to the center of the aperture.

Alternatively, there may be provided another diaphragm device according to the present invention, in which there are provided first diaphragm blades disposed in overlapping relation to one another, pivoted to a base plate and adapted to be stopped down into a shape which is symmetric with respect to the center of the aperture, and a second pair of diaphragm blades which oppose in a direction perpendicular to the specific direction passing through the center of the diaphragm aperture and are adapted to be operated so as to give a flat diaphragm aperture, when the diaphragm is stopped down to a given aperture, so that the diaphragm aperture defined by the aforesaid first diaphragm is elongated in the aforesaid specific direction. As a result, the distance of either of the inner peripheral edges of the second diaphragm to the center of the aperture is different from the distance of either of the inner peripheral edges of the first diaphragm to the center of the aperture.

According to the aforesaid arrangement, even if the aforesaid diaphragm device is stopped down to any diaphragm aperture in an optical system provided with an optical low pass filter, the diaphragm aperture elongated in the aforesaid specific direction may include or cover at least two rows of laminae of the grating.

As a result, the diaphragm device in an optical system may be stopped down to a great $f$-number, without impairing the function of the optical low pass filter to cut off the high frequency components of an image.

BRIEF DESCRIPTION OF THE DRAWINGS

FIGS. 11 and 12 are front views of the FIG. 9 embodiment of the present invention, in which

FIGS. 13 and 14 are front views of a further embodiment of the present invention, in which

DESCRIPTION OF THE PREFERRED EMBODIMENTS

One embodiment of the diaphragm device according to the invention is shown in FIGS. 1 to 6 as including an inner cylinder 10 having an inwardly extending annular base plate 11 defining an opening at the center thereof. A diaphragm operating ring 12 has an annular inwardly extending flange 13 disposed over base plate 11. An operating pin 14 projects radially outwardly of the outer periphery of diaphragm operating ring 12 and extends loosely through an elongated slot 15 located in inner cylinder 10. The free end of pin 14 engages an elongated groove in a diaphragm manipulating ring (not shown, but similar to that of FIG. 10), so that rotation of this diaphragm manipulating ring causes diaphragm operating ring 12 to rotate relative to inner cylinder 10. For simplicity of illustration, only one diaphragm blade 16a of six diaphragm blades 16a, 16b, 16c, 16d, 16e, 16f having an identical shape is shown in broken outline in FIG. 4. The diaphragm blades 16 (16a to 16f) have projecting pins 17 on their back surfaces and projecting pins 18 (18a to 18f) on their front surfaces in a manner to arrange these blades in partly overlapping relation to one another, as viewed in the direction of arrow A of FIG. 1.

Figure 1:
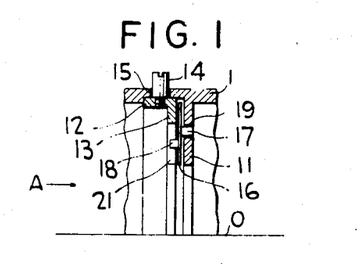
FIG. 1 is a longitudinal cross-sectional view showing a part of one embodiment of the present invention.
Figure 2:
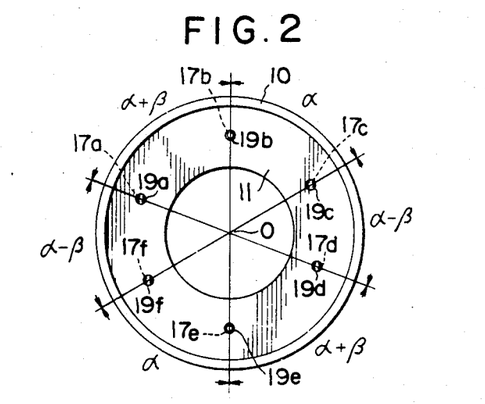
FIG. 2 is a front view of a diaphragm base plate of the embodiment of FIG. 1.

Six holes 19 (19a to 19f) as shown in FIG. 2, are provided in the annular flange of base plate 11, such holes being disposed along a circle concentric with the center O of the base plate, this center O being located on the optical axis of an objective lens. Holes 19 are spaced apart such that adjacent angles defined by radial lines intersecting center O and the holes, vary. More particularly, assuming an angle $\alpha$ which is obtained by dividing 360° by the number of diaphragm blades, and the angular deviation is $\alpha$:

Then, $< 19f, 19a = < 19c, 19d = \alpha - \beta$; while $< 19a, 19b = < 19d, 19e = \alpha + \beta$; and $< 19b, 19c = < 19e, 19f = \alpha$.

With the use of six diaphragm blades for this embodiment, $\alpha$ may be 60°, and the lines through 19b, 19e intersect with the lines through 19c, 19f at an angle of 60°, while the lines through 19a, 19d are angularly biased in the clockwise direction by an angle $\beta$ from the line which equally divides an obtuse angle made by the two lines through 19b, 19e and 19c, 19f.

Figure 3:
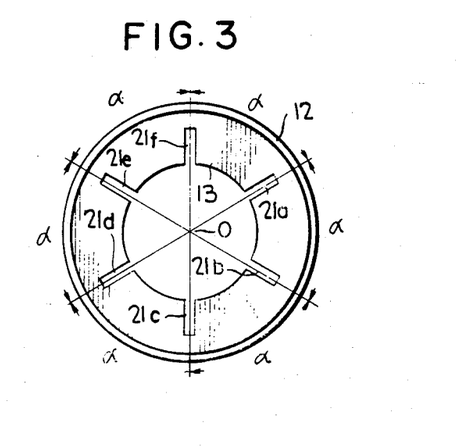
FIG. 3 is a front view of a diaphragm operating ring for use in the aforesaid embodiment.

By contrast, six radially extending slots 21 (21a to 21f) are provided in flange 13 of ring 12 and are equally spaced apart at 60°.

Pins 17 on the diaphragm blades 16 (16a to 16f) are, respectively, pivotally disposed within holes 19, while pins 18 (18a to 18f) provided on the respective diaphragm blades 16 are disposed for sliding movement in guide slots 21 (21a to 21f).

Figure 4:
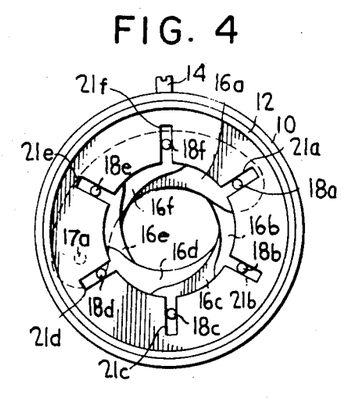
FIG. 4 is a front view showing the condition where the diaphragm is stopped down to a relatively large diaphragm aperture in the aforesaid embodiment.
Figure 5:
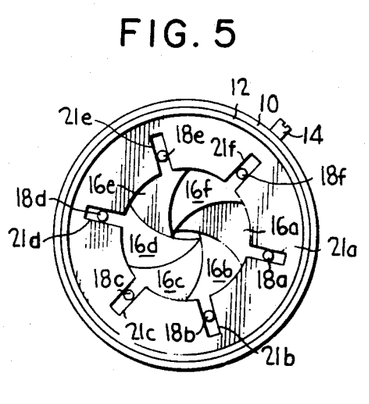
FIG. 5 is a front view showing the condition where the diaphragm is stopped down to a relatively small diaphragm aperture in the aforesaid embodiment.
Figure 6:
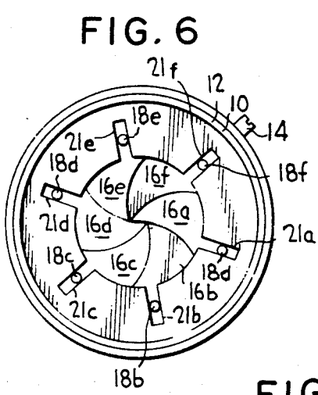
FIG. 6 is a front view showing the condition where the diaphragm is completely closed.

As a result of such an arrangement, a diaphragm aperture as shown in FIGS. 4 and 5 is defined by the inner peripheral edges of the respective diaphragm blades 16 (16a to 16f) which overlap each other. However, as can be seen, the diaphragm aperture thus obtained is not of a circular outline. Since the position of holes 19a and 19d are angularly deviated through an angle $\beta$ from the lines which divide the central angle into six angles, the width of the aperture defined by the opposing inner peripheral edges of diaphragm blades 16a, 16d is smaller than the width of the aperture defined by the other diaphragm blades, so that the diaphragm aperture defined by the inner peripheral edges of the overlapping diaphragm blades is in the shape of an elongated opening having its length extending in a direction perpendicular to the direction of the inner peripheral edges of the blades 16a and 16d which are being stopped down. The distances of the respective points on the periphery of the aperture to the center of the aperture vary with the angular position of the point concerned. The flatness of the aperture, i.e., the eccentricity of the aperture, when the aperture shape assumes that of an ellipse, depends on the aforesaid angular deviation $\beta$ which governs the additional extents, to which diaphragm blades 16a, 16d are to be stopped down, as compared with the extent to which the other blades are being stopped down. Thus, angle $\beta$ is referred to as a "preceding" angle. When operating pin 14 is rotated clockwise relative to inner cylinder 10 to an angular extent greater than that shown in FIG. 4, then the diaphragm is stopped down from the position of FIG. 4 to that of FIG. 5, so that there may be provided an aperture of rectangular shape, whose longer sides are defined by the inner peripheral edges of blades 16a, 16d and whose shorter sides are defined by the inner peripheral edges of diaphragm blades 16b, 16e. When the diaphragm is stopped down to a further extent, then diaphragm blades 16b, 16c, 16e, 16f will be stopped down timingly behind diaphragm blades 16a, 16d when being stopped down, until the diaphragm is completely closed.

Figure 7:
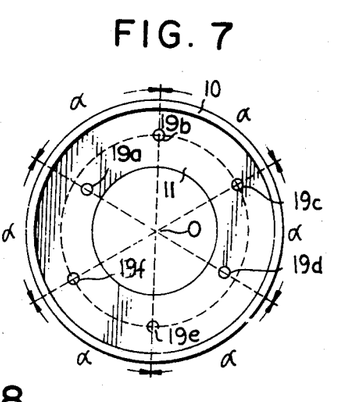
FIG. 7 is a front view of the base plate, showing one modification of the diaphragm device of the aforesaid embodiment.

With the aforedescribed embodiment, the positions of pins 17 (17a to 17f), or the pivot points of the respective blades 16 are fixed by holes 19 (19a to 19f) in inner flange 11, while a different angle defined by two of the holes 19 (19a to 19f) and the center O is provided for a specific pair of blades 16a, 16d. On the other hand, with the modification as shown in FIG. 7, holes 19 are equally spaced apart at angles $\alpha$ of 60°, although the distances from center O to holes 19a, 19d vary, as compared with the distances from center O to the other holes. This arrangement of the blades provides an aperture which is elongated in one direction, with the aperture defined by the inner peripheral edges of the diaphragm blades having an indentical configuration to that shown in FIG. 5.

Figure 8:
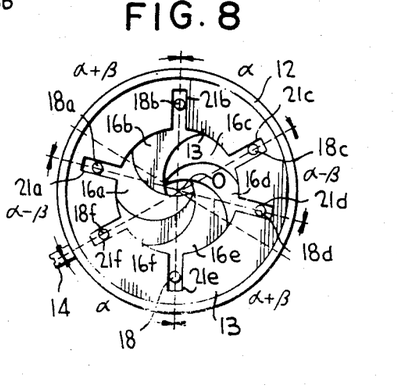
FIG. 8 is a front view of another modification of the diaphragm device for use in the aforesaid embodiment.

With another modification shown in FIG. 8, the central angles defined by two of the holes 19 (19a to 19f) and center O are maintained equal, while the distances of all the respective holes 19 (19a to 19f) to center O are maintained equal. Only opposing guide slots 21a, 21d are positioned in an angularly deviated manner by an angle $\beta$ from the lines which equally divide 360° about the center O. Pins 18a, 18d are respectively located in guide slots 21a, 21d. With this arrangement, the diaphragm aperture defined by the inner peripheral edges of overlapping blades 16 (16a to 16f) will be of such a configuration that the arcs formed by the inner peripheral edges of blades 16a, 16d are positioned closer to the center O, as compared with the other arcs formed by the inner peripheral edges of the other blades, so that there results a configuration of an aperture which is elongated in a direction perpendicular to the direction in which the inner peripheral edges of diaphragm blades 16a, 16d are being stopped down.

FIGS. 9 to 12 show the second embodiment of the present invention. Similarly as in the first embodiment, an inner cylinder 23 is provided as having an annular inwardly extending flange 24 having a central opening. A first diaphragm operating ring or plate 25 is slidingly disposed within inner cylinder 23 and is provided with an inwardly extending annular flange 26 overlying flange 24. Six first diaphragm blades 27 are provided as each having an elongated guide slot 28, each blade being of the same shape. A diaphragm manipulating pin 29 extends radially outwardly of ring 25 through an elongated arcuate slot 31 located in inner ring 23. Pins 32 and 33 are mounted on opposite sides of diaphragm blades 27. Pins 32 are respectively disposed for sliding movement in guide slot 28, while pins 33 are respectively disposed for pivotal movement in apertures 34 located in flange 24. These six apertures are located along a circle concentric with center O and are equally spaced apart by equal angles of 60°.

Figure 9:
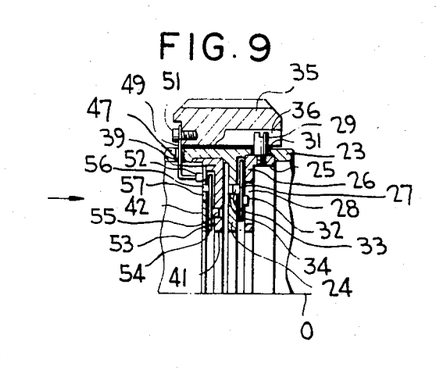
FIG. 9 is a longitudinal cross-sectional view showing a part of another embodiment of the present invention.

A diaphragm manipulating ring 35 surrounds the outer periphery of inner cylinder 23 and is mounted for rotation with respect thereto, the ring having an arcuate groove 36 at its inner periphery. Pin 29 extends into groove 36 and is urged against one sidewall thereof by means of a tension spring 37 secured at opposite ends to a pin 38 on diaphragm manipulating ring 35 and to diaphragm manipulating pin 29, respectively.

A diaphragm holding ring 39 is disposed within inner cylinder 23 on a side opposite flange 26, the holding ring having an inwardly extending annular flange 41 parallel to flange 24. A second diaphragm operating plate 42 is rotatably mounted within diaphragm holding ring 39. A tension spring 43 is secured at its opposite ends to a pin 44 projecting from diaphragm operating plate 42 as well as to a pin 45 which projects radially inwardly from inner cylinder 23. Thus, spring 43 causes second diaphragm operating plate 42 to rotate clockwise as viewed in the direction of arrow A in FIG. 1, relative to inner cylinder 23. However, the rotation of diaphragm operating plate 42 is interrupted by a stopper pin 46 projecting inwardly from inner cylinder 23, due to plate 42 being urged against pin 46 as in the manner shown in FIG. 10. An arcuate slot 47 of a size corresponding to the diaphragm operating angle of diaphragm manipulating ring 35 is located in inner cylinder 23, while an operating pin 48 mounted on second diaphragm operating plate 42 extends outwardly thereof, a diaphragm manipulating lever 49 secured to diaphragm manipulating ring 35 as by a screw 51 through arcuate slot 47 toward diaphragm operating plate 42 so as to engage an operating pin 52.

Two apertures 53 are provided in flange 41 at equal distances from center O although closer thereto as compared to aperture 34. Second diaphragm blades 54 comprising two blades have pins 55 mounted on one side thereof and pivotally supported in holes 53, respectively. Pins 56 are mounted on the opposite sides of blades 54 and are disposed for sliding engagement with elongated cam slots 57 provided in diaphragm operating plate 42 at equal distances from center O.

Figure 10:
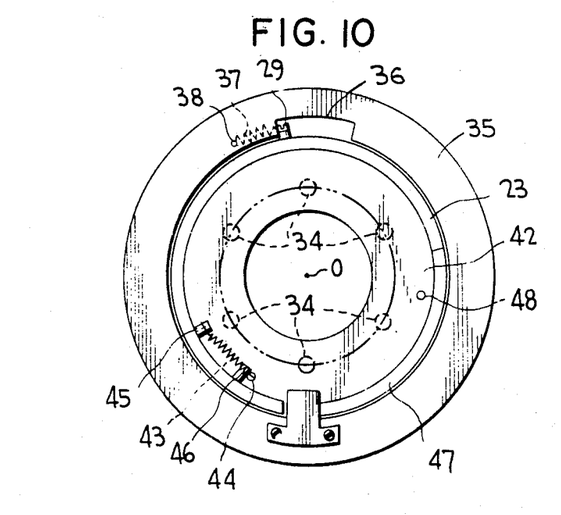
FIG. 10 is a front view as viewed in the direction A of arrow A of FIG. 9, with the diaphragm blades of the embodiment of FIG. 9 being omitted for clarity.
Figure 11:
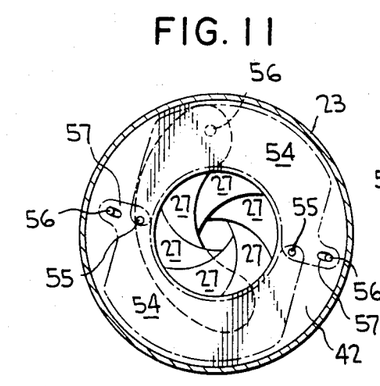
FIG. 11 shows the condition where the diaphragm is stopped down to a given diaphragm aperture which would include two rows of laminae in an optical low pass filter.
Figure 12:
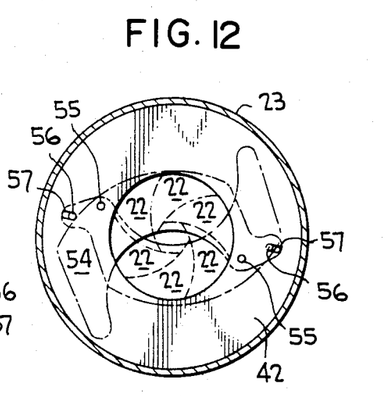
FIG. 12 shows the condition where the diaphragm is stopped down to a further extent.

FIG. 10 shows the diaphragm in its open position. With this embodiment, when diaphragm manipulating ring 35 is rotated counterclockwise, with the diaphragm being in the aforesaid open position, then first diaphragm operating ring 25 is rotated counterclockwise by means of diaphragm manipulating pin 29 being under the tension of spring 37, while the first diaphragm blades 27 are guided by guide cam slots 28 so as to be stopped down in a manner as shown in FIG. 11, thus providing a diaphragm aperture substantially in the shape of a circle. In this respect, diaphragm operating lever 49 is maintained free from engagement with operating pin 52, so that the diaphragm operating plate 42 is free to move relative to inner cylinder 23 as well as to diaphragm holding ring 39, while the second diaphragm blades 54 are maintained in their open positions.

When the diaphragm is stopped down to a given aperture by means of diaphragm blades 27, then diaphragm operating lever 49 engages operating pin 52. When diaphragm manipulating ring 35 is rotated counterclockwise so as to stop down the diaphragm to a further extent, then diaphragm operating plate 42 as well begins to rotate counterclockwise due to the aforesaid engagement. Because of the difference in configuration between the first and second diaphragm blades 27 and 54, in addition to the difference in configuration between guide slots 28 and 57, and because the axial positions of pivotal pins 55 of second diaphragm blades 54 are closer to center O than pins 33 of first blades 27, the second diaphragm blades are rotated through an angle larger than the first diaphragm blades, so that the inner peripheries of the second diaphragm blades shield part of the diaphragm aperture defined by the opposing arcs or inner peripheral edges of the first diaphragm blades which overlap one another. As a result, the resulting diaphragm aperture defined by the first diaphragm blades and the second diaphragm blades will be a flat aperture, in which the distances of the respective points on the periphery of the diaphragm aperture to the center of the aperture vary. Meanwhile, even if diaphragm manipulating ring 35 is rotated counterclockwise to a further extent, the first diaphragm blades are no longer stopped down to any extent because of the configuration of guide cam slots 28. In other words, the minimum diameter of the aperture defined by the first diaphragm blades may be maintained up to a specific value. In this connection, the minimum diameter of the aforesaid aperture is set to a value which includes two rows of laminae of the grating of an optical low pass filter, so that even if the first diaphragm blades are stopped down to a further extent, the length of the diaphragm aperture in a flatwise direction thereof may be maintained to a length which may cover two rows of laminae of the grating of the optical low pass filter, as shown in FIG. 15, so that the function of the optical low pass filter to cut off the high frequency components may be maintained.

The second embodiment, however, requires two kinds of diaphragm blades, i.e., the first and second diaphragm blades 27, 54, thus providing some difficulty in the mass production thereof.

Figure 13:
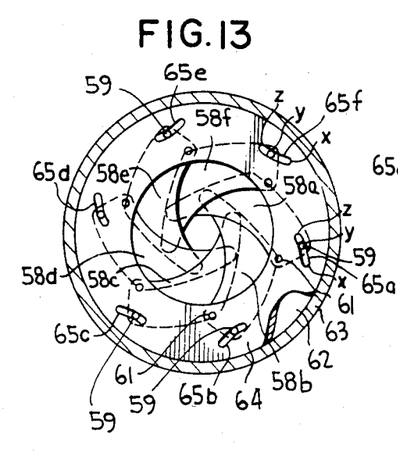
FIG. 13 shows the condition where the diaphragm is stopped down to a given diaphragm aperture.
Figure 14:
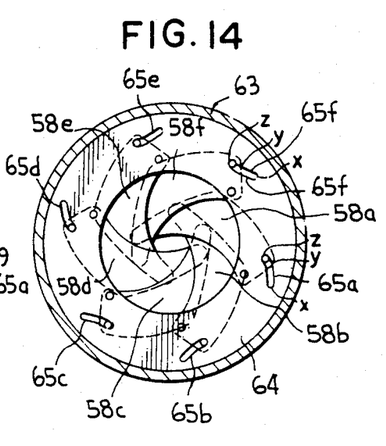
FIG. 14 shows the condition where the diaphragm is stopped down to a further extent.

The third embodiment shown in FIGS. 13 and 14 may be said to be a compromise between the first and second embodiments in that only one type of a diaphragm blade is used. More particularly, all of such one type of diaphragm blades are together stopped down from their open position, until the diaphragm is stopped down to an aperture of a size which includes two rows of laminae of the grating of an optical low pass filter, after which only the opposing two blades extending in a directional perpendicular to the direction of the grating are stopped down, while undisturbing the four diaphragm blades which define part of the periphery of the diaphragm aperture at the opposite ends of the length of the aperture.

Six diaphragm blades 58a, 58b, 58c, 58d, 58e, 58f are all of identical configuration as shown in FIG. 13. Two pins 59, 61 are mounted on opposite surfaces of each diaphragm blade, respectively, pin 61 of each blade being pivotally disposed in an aperture defined in an inwardly extending annular flange 62 of an inner cylinder 63. Located in a diaphragm operating ring 64 which is disposed within inner cylinder 63 and rotatable relative thereto are cam slots 65a, 65b, 65c, 65d, 65e, 65f, in which pins 59 of the respective diaphragm blades 58 (58a to 58f) are slidingly disposed. As a result, when the diaphragm operating ring is rotated, then the respective diaphragm blades 58 (58a to 58f) are rotated about their respective pins 61, so that the inner peripheral edges of the overlapping blades define a diaphragm aperture. The configurations of cam slots 65 (65a to 65f) are identical in the ranges extending from their one ends x, in which the diaphragm is fully opened, to positions y, in which the diaphragm aperture defined by the respective diaphragm blades 58 (58a to 58f) is stopped down to an extend which covers two laminae of the grating of an optical low pass filter. However, the configurations of cam slots 65b, 65c, 65e, 65f other than cam slots 65a and 65d, in which are disposed pins 59 of a pair of diaphragm blades 58a, 58d opposing one another with respect to the center of the aperture, are arcs having their centers at the center of the diaphragm aperture, in the ranges of extending between points y and z which are beyond the points y. In other words, the configurations of cam slots 65a and 65d are such that their portions between their respective points y and z are closer to the center of the aperture as compared to like portions of the remaining slots z.

As a result, when diaphragm operating ring 64 is rotated so as to effect movement of pins 59 from points x to points y, then all diaphragm blades 58a to 58f are together rotated counterclockwise through the same angle, so that the diaphragm is stopped down to a shape inscribed within a circle. However, when the pins reach points y, such inscribed aperture will be of a size which includes two rows of laminae of the grating of the optical low pass filter. When diaphragm operating ring 64 is further rotated counterclockwise, then diaphragm blades 58b, 58c, 58e, 58f remain intact, because of the configurations of cam slots 65b, 65c, 65e, 65f extending between their respective points y and z, while only two diaphragm blades 58a, 58d are further rotated counterclockwise, because of the configurations of cam slots 65a, 65d extending between their respective points y and z, so that the width of the diaphragm aperture in the direction of the grating will be compressed, thus providing an elongated diaphragm aperture having its length covering two rows of the laminae of the grating, as shown in FIG. 15.

As is apparent from the foregoing description of the diaphragm device according to the present invention, even if the diaphragm is stopped down to any small diaphragm aperture, the diaphragm blades will nevertheless not interfere with one another, thereby allowing the complete closure of the diaphragm, with the result of protection of a light sensitive material. In addition, there may be maintained the function of the optical low pass filter to cut the high frequency components of an image in an optical system provided with a color-encoding filter, i.e., to remove a beat produced between the striped pattern of an image and the strips of a color encoding filter. In addition, the diaphragm may be stopped down to a diaphragm aperture which includes two rows of the laminae of the grating of an optical low pass filter.

Although the invention has been described in several preferred forms with a certain degree of particularity, it is understood that many apparently widely different embodiments of this invention may be made without departing from the spirit and scope thereof, and the invention is not limited to the specific embodiments thereof except as defined by the appended claims.

What is claimed is:

1. A diaphragm device, comprising:

base plate means having a central opening of substantially circular shape;

first diaphragm blades each mounted on said base plate means in partially overlapping relation to form a diaphragm aperture defined by inner peripheral edges thereof each having a curved identical profile, said first blades each being mounted for pivotal movement through a predetermined angle to define said aperture of a predetermined size;

a pair of second diaphragm blades disposed opposite one another relative to the center of the opening in said base plate means, said second blades being mounted on said base plate means in partially overlapping relation to said first blades, and said second blades each being mounted for pivotal movement through an angle greater than said predetermined angle so that the inner peripheries of said second blades may shield part of the aperture defined by said inner peripheries of said first blades to thereby reduce said predetermined size of said aperture, said inner peripheries of said second blades each having a curved identical profile;

means engaging each of said blades for pivoting them to vary the size of the diaphragm aperture, said means which engage said second blades causing them, when it is desired to reduce said predetermined size of said aperture, to pivot further than said first blades are caused to thereby pivot so as to define a part of said aperture, whereby said peripheral edges of said second blades defines with a portion of said peripheral edges of said first blades an elongated aperture by reason of the opposed relation of said second blades and their greater angular movement.

2. The device according to claim 1 wherein said means for pivoting said blades includes a diaphragm operating ring having a substantially circular central opening superimposed over said base plate means central opening, said ring being coupled with said base plate means for relative rotation therewith, said first and second blades being pivotally connected to said plate means by a pin-and-hole engagement and respectively to said ring by a pin-and-slot engagement, whereby relative rotation of said ring and said plate means effects pivotal movement of said blades.

3. The device according to claim 2, wherein said base plate means comprises a cylinder having an inner annular flange, a diaphragm manipulating ring surrounding said cylinder an being coupled to said operating ring for causing said relative rotation with said cylinder.

4. The device according to claim 2, wherein each of said first and second blades has a pin thereon seated within holes provided in said plate means for pivotally connecting said blades thereto, said holes for each said blade pin being arranged along a circle concentric with said opening, said holes for each said second blade pin lying between a pair of said holes for each said first blade pin, opposing pairs of said holes for each said first blade pin, opposing pairs of said holes lying along diametral lines, one of said lines along which said second blade pin holes lie being deviated from the remainder of said lines, each of said first and second blades also having a pin thereon seated within elongated slots equally spaced apart in said ring.

5. The device according to claim 2, wherein each of said blades has a pin thereon seated within holes provided in said plate means for pivotally connecting said blades thereto, each of said holes being arranged along a circle concentric with said opening, each of said blades also having a pin thereon seated within elongated slots provided in said ring, pairs of said slots lying along diametral lines, one of said lines along which a pair of said slots associated with said second blades lies being deviated from the remainder of said lines, and said slots in said second ring being straight and radially disposed.

6. The device according to claim 2, wherein each of said first and second blades has a pin thereon seated within holes provided in said plate means for pivotally connecting said blades thereto, said holes for each said blade pin being arranged along a circle concentric with said opening, each of said blades also having a pin thereon seated within like elongated slots equally spaced apart in said ring, each said slot associated with each said second blade having a portion thereof lying closer to the center of said opening than like portions of each said slot associated with each said first blade, so that said second blades may be pivoted at a greater angular movement.

7. The device according to claim 2, wherein means are provided on said ring for effecting relative rotation of said ring and said plate means when the aperture is at said minimum size.

8. The device according to claim 1, wherein said means engaging said blades include a first diaphragm operating ring and a second diaphragm operating ring each having a substantially circular central opening therein superimposed over said central opening of said base plate means, said rings each being coupled with said base plate means for relative rotation therewith, said first and second blades being pivotally connected to said base plate means by a pin-and-hole engagement and respectively to said rings by a pin-and-slot engagement, holes provided in said plate means for the reception of pins provided on said blades; said holes for each said first blade pin being arranged along a circle concentric with said opening, and holes for each said second blade pin being arranged along a circle concentric with said opening and of a smaller diameter than said first-named circle.

9. A diaphragm device, comprising:
a base plate having a central opening of circular shape;
an operating ring coupled to said plate for relative rotation and having a central circular opening superimposed over said plate opening;
a plurality of diaphragm blades disposed between said plate and said ring in partially overlapping ralation to one another to define a diaphragm aperture by the inner peripheral edges thereof, said blades being pivotally mounted to said plate and to said ring for movement upon relative rotation of said ring and said plate, said blades having pins on opposite sides thereof seated within holes provided in said plate and within slots provided in said ring, a pair of opposing ones of said blades being mounted in place for a first angular movement, the remainder of said blades being mounted in place for a second angular movement less than said first angular movement, whereby a substantially rectangular diaphragm aperture is formed by said inner peripheral edges of said opposing blades and a pair of said remainder blades.

10. The device according to claim 9, wherein said holes are arranged along a circle concentric with the center of said opening, pairs of said holes lying along diametral lines, one of said lines along which a pair of said holes associated with said opposing blades lies being deviated from the remainder of said lines whereby said holes are spaced apart at different distances.

11. The device according to claim 9, wherein a pair of said holes associated with said opposing blades are arranged along a circle of a first diameter, the remainder of said holes being arranged along a circle of a second diameter, both said circles being concentric with the center of said opening, said second diameter being greater than said first diameter, and said holes being equally spaced apart.

12. The device according to claim 9, wherein said slots lie along diametral lines, one of said lines along which a pair of said slots associated with said opposing blades lies being deviated from the remainder of said lines whereby said slots are spaced apart at different distances.

13. A diaphragm device, including:
an objective lens;
an optical low pass filter for cutting off the high spacial frequency for preventing a false color produced in an image due to a beat caused between a color signal carrier of a color encoding filter and the high frequency components of said image formed by said objective lens, said optical low pass filter having a transparent substrate and a phase grating which causes retardation of light passing through the filter;
a plurality of diaphragm blades partially overlapping to define a diaphragm aperture by the inner peripheral edges thereof, said aperture being concentric with the center of said lens;
means cooperating with said blades for stopping them down to a minimum diaphragm aperture which is elongated in a direction perpendicular to strips of the grating and which covers at least two of said strips of the grating,
whereby the diaphragm opening may be stopped down to a large $f$-number without sacrificing the function of said optical low pass filter to cut off the high spacial frequency.

14. A diaphragm device as set forth in claim 13, wherein said means comprises:
a base plate having a central opening;
said diaphragm blades having first pins thereon for pivotally securing said blades to said base plate;
second pins on said blades respectively spaced from said first pins;
a diaphragm operating ring provided with guide slots which receive said second pins for allowing said diaphragm blades to rotate about said first pins, said diaphragm operating ring being rotatable relative to said base plate in association with a stopping down operation of the device;

means for providing a larger rotational angle for a first pair of said diaphragm blades opposing each other in the direction of said grating, when said diaphragm operating ring is operated, as compared with the rotational angle of a second pair of said diaphragm blades; and means for causing said first pair of diaphragm blades to close the diaphragm aperture, when the spacing between the opposing inner peripheral edges of said second pair of diaphragm blades is such as to cover at least two laminae of said grating, as viewed in the direction perpendicular to the direction of said grating.

15. A diaphragm device as set forth in claim 13, wherein said means comprises:

a base plate having a central opening;

said blades including a plurality of first diaphragm blades having first pins thereon for pivotally securing said first blades to said base plate in a symmetrical manner with respect to the center of said opening in said base plate, said first blades being arranged in partly overlapping relation to one another and defining a second diaphragm aperture;

second pins on said blades respectively spaced from said first pins;

a first diaphragm operating ring provided with first guide slots disposed at equal angles relative to one another for the reception of said second pins, said first diaphragm operating ring being rotatable relative to said base plate in association with the stopping down operation;

said blades including a pair of second diaphragm blades of identical shape and having third pins thereon for pivotally securing said second blades to said base plate symmetrically with respect to the center of said opening of said base plate;

fourth pins on said second blades respectively spaced from said third pins;

a second diaphragm operating ring provided with a first pair of second slots which receive said fourth pins for allowing said second diaphragm blades to rotate relative to said base plate, said second guide slots being positioned at equal angles from one another, and said second diaphragm operating ring being rotatable relative to said base plate, in association with the stopping down operation of said diaphragm aperture; and a diaphragm manipulating means for stopping down said second diaphragm blades in a direction of said grating on a diaphragm aperture of a size smaller than the aperture which includes two rows of laminae of said grating, after said first diaphragm ring has stopped down said first diaphragm blades from their fully open position to an aperture which includes at least two rows of laminae of said grating.

16. A diaphragm device as set forth in claim 13, wherein said means comprises:

a base plate having a central opening;

said blades including at least four diaphragm blades of identical shape and having first pins thereon for pivotally securing said blades to said base plate symmetrically with respect to the center of said opening in said base plate; and a diaphragm operating ring provided with guide slots, second pins on each of said diaphragm blades received in said slots for allowing said diaphragm blades to rotate relative to said base plate, said guide slots being located on radial lines angularly spaced by distances equal to the division of the central angle around the center of said opening in said base plate by the total number of said diaphragm blades, said diaphragm ring being rotatable relative to said base plate in association with the stopping down operation of said diaphragm opening;

said guide slots comprising a first pair of guide slots, in which are disposed a first pair of said second pins of said diaphragm blades adapted to open and close in the direction of said grating, said first pair of guide slots effecting pivotal movement of said diaphragm blades, until said diaphragm aperture is completely closed by the inner peripheral edges of said diaphragm blades, and (ii) a second pair of guide slots which receive a second pair of said second pins, and being adapted to rotate the remainder of said diaphragm blades from their open position to a position, in which the spacing between the opposite peripheral edges of said remainder of said blades becomes such as to cover two rows of laminae of said grating, the inner peripheral edges of said remainder of said diaphragm blades being moved due to said rotation in the direction perpendicular to the direction of said grating, and thereafter the rotation of said remainder of said blades is stopped, thereby maintaining said spacing intact.

17. A diaphragm device for use in an optical system of a single image tube or a double image tube color television camera wherein an optical low pass filter having a transparent substrate and a phase grating causing retardation of light being transmitted therethrough is disposed in the optical system of the camera with the grating making a right angle with the scanning direction of the camera, thereby cutting off the high frequency components of an image formed through an objective lens provided for the camera, in an attempt to preclude the occurrence of a false color, comprising;

a plurality of diaphragm blades partially overlapping to define a diaphragm aperture by the inner peripheral edges thereof, said aperture being concentric with the center of said lens;

means cooperating with said blades for stopping them down to a minimum diaphragm aperture which is elongated in a direction perpendicular to stripes of the grating and which covers at least two of said stripes of the grating, whereby the diaphragm opening may be stopped down to a large $f$-number without sacrificing the function of said optical low pass filter to cut off the high spacial frequency.

18. The device according to claim 17, wherein said means cooperating with said blades include base plate means having a substantially circular central opening, operating means mounted for rotation relative to said base plate means and having a substantially circular central opening concentric with said base plate means opening, said blades being disposed between said plate means, and said operating means, a pair of said blades being diametrically opposed to one another, and means provided for interconnecting said blades with said operating means and said plate for causing said pair of blades to be stopped down at a faster rate than the remainder of said blades at least when the diaphragm aperture is smaller than a predetermined value.

* * * * *